Dec. 22, 1953   V. F. A. NORDSTRÖM ET AL   2,663,144
COMBINED GAS AND STEAM POWER PLANTS
Filed May 6, 1948                           5 Sheets-Sheet 1
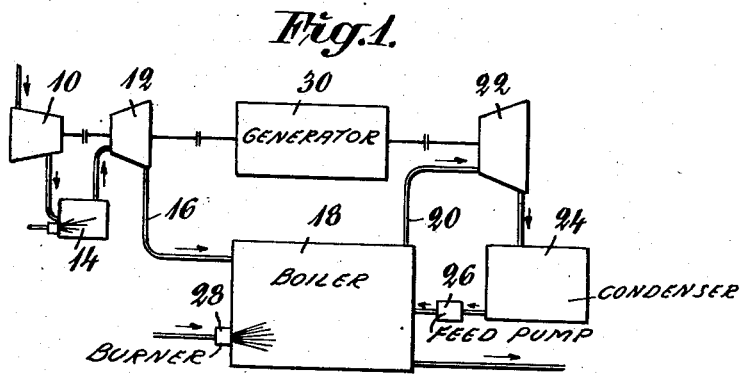
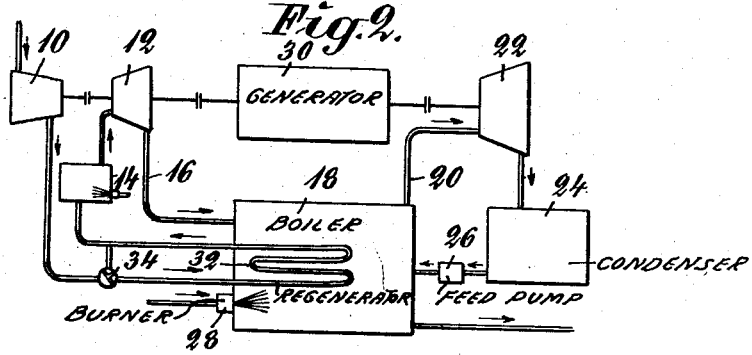
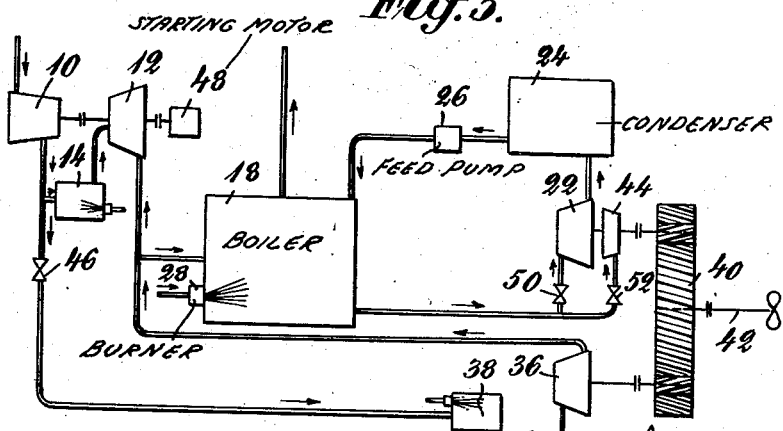
Inventors:
Vilhelm Fredrik Andre Nordström
Dimitrij Andrejevitch Morosoff
by Jarvis C. Marble
Their Attorney

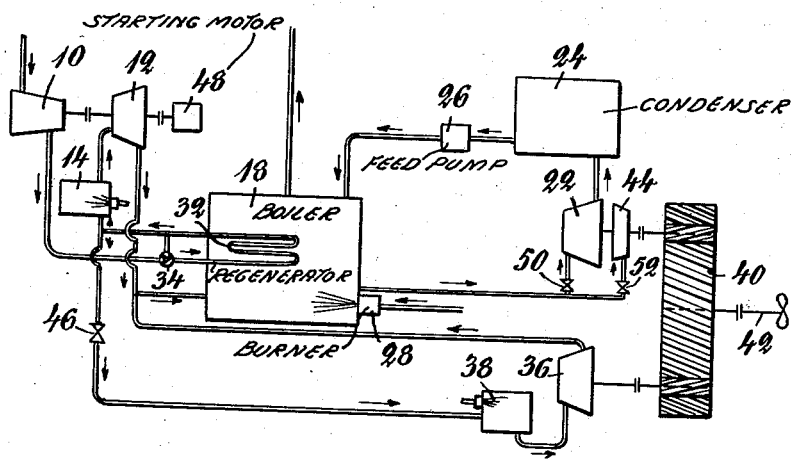
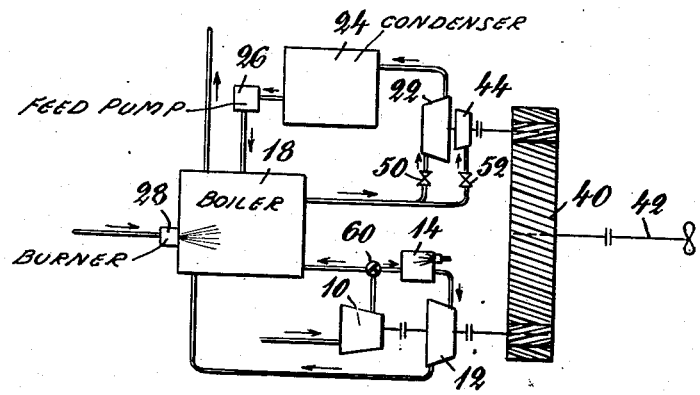

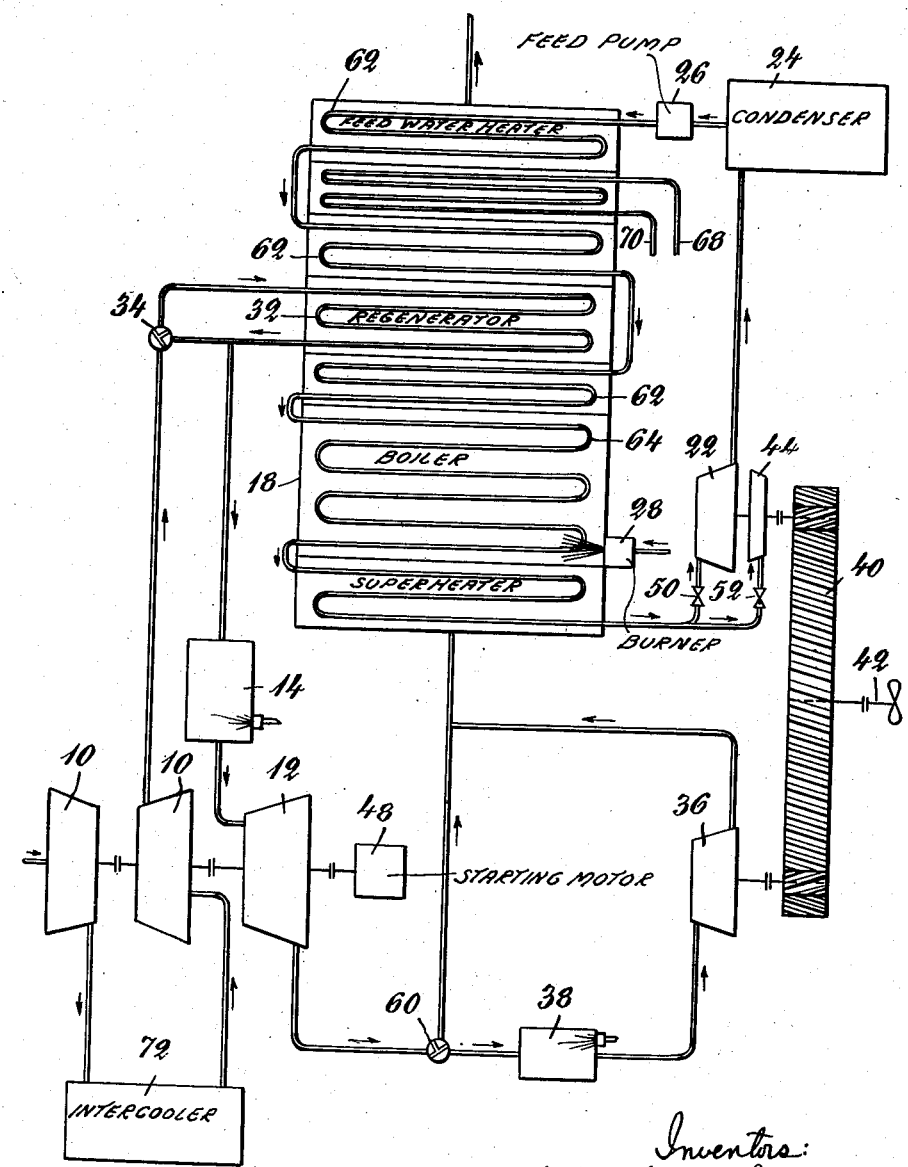

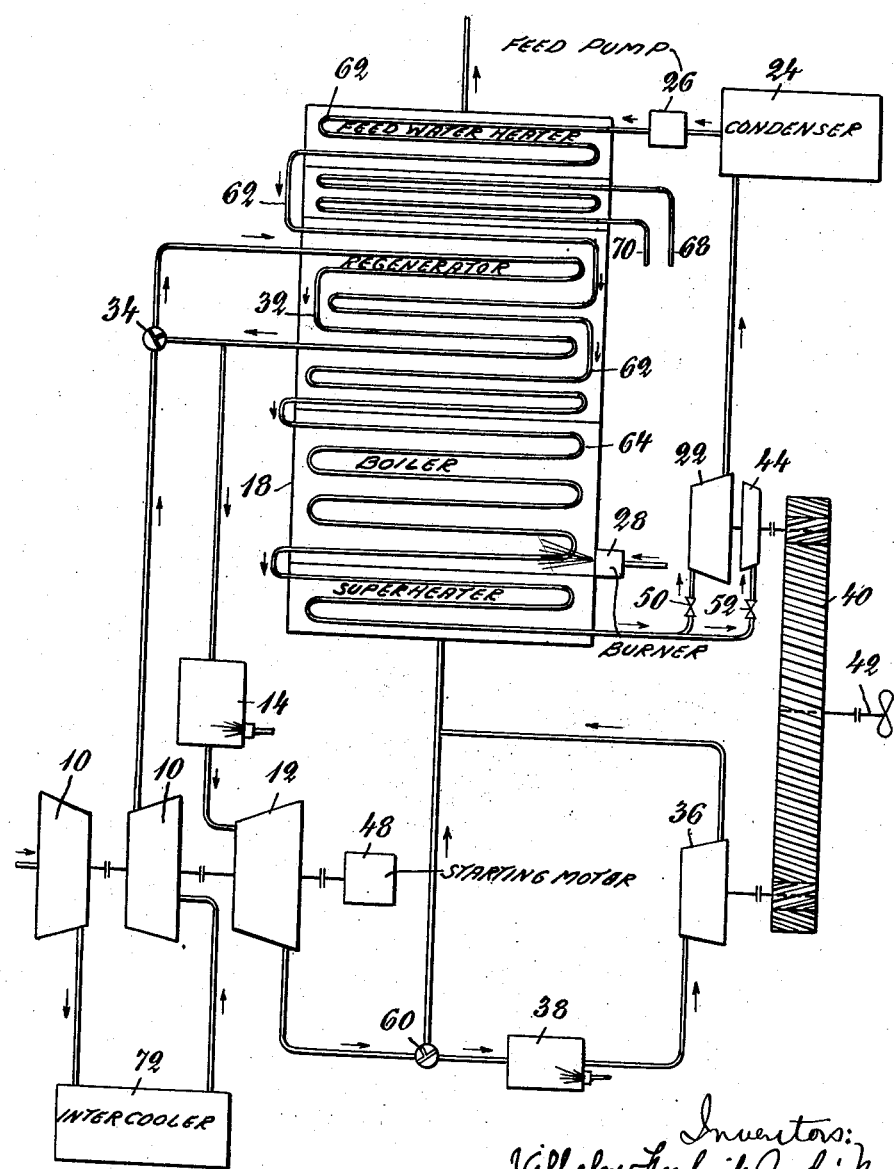

Patented Dec. 22, 1953

2,663,144

UNITED STATES PATENT OFFICE 2,663,144

COMBINED GAS AND STEAM POWER PLANT

Vilhelm F. A. Nordström, Stockholm, and Dimitrij A. Morosoff, Enskede, Sweden, assignors, by mesne assignments, to De Laval Steam Turbine Company, Trenton, N. J., a corporation of New Jersey Application May 6, 1948, Serial No. 25,356

21 Claims. (Cl. 60—39.18)

1

The present invention relates to a power plant containing steam turbines as well as gas power machines of the continuous flow type as power generating engines in a certain mutual combination as described below.

The main object of the invention is to provide a power plant having a higher thermal efficiency than has been possible to arrive at in hitherto proposed plants comprising the above mentioned type of power engines.

Another object is to design a power plant in which it is possible to vary the total output energy with the load substantially by the aid of the steam turbine section of the combined power plant for the purpose of having the gas power engines running more constantly within their best efficiency range.

In order to gain the above objects and other advantages which will become evident from the following description the power plant according to the invention comprises a gas power section containing one or more compressors, combustion chambers, power engines, e. g. gas turbines, and suitably a regenerator, and a steam turbine section consisting of one or more steam generators comprising vaporizing sections or boilers with economizer and superheater together with one or more steam turbines and condensor, the different power generating sections being combined in such a way that the exhaust gases from the last gas power engine are led to the steam boiler for generating and superheating steam and for preheating the feed-water before they escape through the stack. The regenerator for the motive fluid to the gas power engines can suitably also be inserted in the steam boiler unit.

Calculations have given the result that the heat content in the exhaust gases from a gas turbine is sufficient for generating a quantity of steam which in a steam turbine will give energy of about the same order as the output energy of the gas turbine. Consequently, if in a combination plant according to the invention the gas power engines and the steam power engines are designed for equally high output energy, it will thus be possible to generate in the combined plant about twice the useful energy available by using solely gas turbines and expelling the exhaust gases directly in the air. Thus, it is not necessary to feed any fuel to the steam boiler in a plant according to the invention except in cases of need for increased power output, e. g. in the case of peak loads. If in such cases of increased power output needed fuel is fed to the boiler, it is not necessary simultaneously to add extra

2 combustion air because there is always quite sufficient excess of oxygen present in the exhaust from a gas turbine or other gas power engine to assure the combustion in question.

From the above it is also obvious that the plant should suitably be designed in such a way that its average load is taken substantially from the gas engines and that variations in load are primarily controlled by means of the steam turbine section.

Even if in a device according to the invention as described above the excess heat content of the exhaust gases from the gas power section is largely utilized for the generation of steam, the invention does not exclude a design in which a regenerator for preheating the compressed air for the gas power engines before it is introduced in the combustion chambers is inserted in the exhaust conduits from said gas power engines. Such a regenerator may as is already mentioned be placed within the steam boiler. At first sight it seems to be most close at hand to insert the regenerator between the steam generating zone and the economizer. A more thorough investigation shows, however, that such an arrangement is not the most advantageous from the point of view of thermal economy as will be evident from the following.

The temperature of the exhaust gases from a gas power plant is of course always of a considerably less order of magnitude than the temperature obtained in the combustion chamber of a direct-fired steam boiler. Due to this fact a considerably greater quantity of combustion gases per kilogram of generated steam will be needed in a device according to the invention than in a direct-fired boiler. The increased quantity of heating gases necessary in an exhaust-fired boiler is of such an order that it contains a considerable heat surplus above that needed in the economizer for preheating to the boiling point of a feed-water quantity corresponding to the quantity of steam generated. The temperature of the exhaust gases, however, is relatively low and a regenerator placed between the steam generating zone and the economizer would decrease the temperature to a value which would in turn make impossible the preheating of the feedwater to the steam generation temperature. When the flue gases are then discharged from the economizer their temperature on the other hand is too low for enabling a preheating of the motive fluid of the gas power plant to be performed. From this it is obvious that the regenerator for the gas power plant must be located in a suitable section within the economizer.

As large quantities of flue gases are needed per kilogram of generated steam the relation between the quantity of flue gas and of feed water passing the economizer per unit of time will be very large. This in turn means that the temperature of the feed-water will increase faster than the temperature of the flue gases decreases, resulting in a further heat surplus of the stack gases. Consequently in a certain zone within the economizer a temperature equilibrium will prevail from which zone the feed-water temperature will increase only in the same degree as flue gas temperature decreases. That zone of the economizer where this occurs is the most suitable zone for placing the regenerator. Thereby the regenerator may be coupled in series or in parallel with the feed-water tubes. By utilizing in this way part of the heat surplus of the flue gases the stack temperature is decreased and consequently the total heat efficiency of the plant is increased. Of course, it is also possible to place a further heat exchanger within the economizer nearer the stack for the purpose of making use of further possible heat surplus from the flue gases.

The installation of the regenerator within the economizer or anywhere in the exhaust pipe from the gas power engines also gives a possibility to cut down the total power output of the plant while maintaining the normal efficiency of the gas power section, in that normally only part of the compressed air passes the regenerator while the rest through a branch conduit is led directly to the combustion chamber, where the fuel injection is regulated for maintaining normal admission temperature of the motive fluid to the gas power engines. As the compressed air will take up part of the heat supplied to the boiler with the exhaust gases, the steam generation will vary with the portion of compressed fresh air passing through the regenerator. If the regenerator is completely cut off, the steam generation is of course increased and may be further forced at peak load by injection and combustion of fuel in the gas chamber of the boiler.

In cases where it is desirable to transform the energy delivered by the power engines into electric energy it may be advantageous to couple the gas power engines and the steam turbines to one and the same electric generator and suitably one of these power delivering engines to each end of the generator shaft. If in the case of a larger plant or for some other reason it should be deemed suitable to split the gas power section into two gas power engines, e. g. gas turbines, each of these may be connected to one outer end of two electric generators, the steam turbine or turbines being installed between the generators so that all machines become co-axial. In such a case the steam turbine may be of the double rotation type and both turbine stages directly coupled to the generators without gearing.

As mentioned above it is sometimes suitable to divide the gas power section into two or more engines coupled either in series or parallel with regard to the flow of motive fluid. In the case of gas power engines coupled in series it is advisable to utilize interstage or reheating combustion so that the admission temperature becomes substantially the same for all power engines. Such plants with divided gas power engines are suitable when one gas power engine is desirable for running the compressors of the gas power section and another engine for delivering useful output, e. g. when the useful output gas engine together with the steam turbine is to be coupled to a common output shaft e. g. the propeller shaft of a vessel. In this last mentioned case it may also be suitable to divide the steam turbine into two or more units coupled in series or parallel, whereby the power engine for astern operation is one of the steam turbines and the output gas power engines are so designed that they can be shut down during astern operation, e. g. by cutting off the flow of motive fluid.

When dividing the gas power engines into several units coupled in series with regard to the flow of motive fluid, the output of these engines being utilized for different purposes, viz. one or more engines for running the compressors and the rest for delivering useful output, all said machines must be coupled in a definite sequence in order to make possible the most advantageous utilization of the heat energy of the fuel. The sequence must be such that the gas power engine, e. g. turbine, having the smallest pressure drop and thus also the smallest heat drop, is placed closest to the steam boiler in order that the exhaust gases from this engine, having the highest exhaust gas temperature be utilized for steam generation, resulting in higher steam temperature and higher steam pressure for the steam turbine section.

In the following the invention will be more fully described with reference to the accompanying drawings, in which some embodiments of the invention are schematically shown by way of example.

In the drawings:

Fig. 1 illustrates a plant consisting of one gas turbine with compressor and combustion chamber and one steam turbine with steam boiler, condenser and feed pump, the gas turbine and steam turbine being coupled each to one shaft end of an electric generator.

Fig. 2 shows a similar plant to that illustrated in Fig. 1 with a regenerator installed in the steam boiler.

Fig. 3 illustrates a plant with divided gas turbine and steam turbine for delivering useful energy to a propeller shaft over a common reduction gear.

Fig. 4 illustrates a plant corresponding to that shown in Fig. 3 but with one single regenerator for the gas turbine plant in the steam boiler.

Fig. 5 shows a combined plant similar to the one shown in Fig. 3 but with one single gas turbine which drives the compressor, in this case suitably of the centrifugal type, and simultaneously delivers torque over the same reduction gear as the steam turbine.

Fig. 8 shows a plant substantially corresponding to the one illustrated in Fig. 3 but with a regenerator inserted in series between two sections of the economizer and with two gas power engines coupled in series.

Fig. 9 finally shows a plant corresponding to that of Fig. 8 but with the regenerator coupled in parallel with the feed-water tubes in one section of the economizer.

Figure 6:
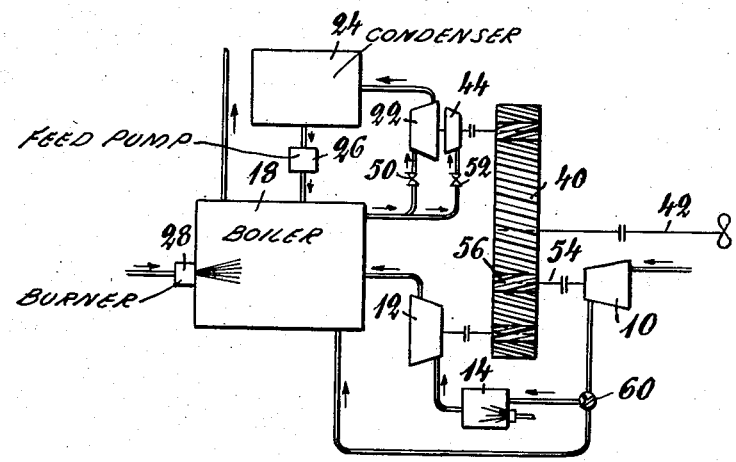
Fig. 6 shows a modification of the plant illustrated in Fig. 5, in which the compressor is driven over a separate gear coupled to the reduction gear for enabling the gas turbine and the compressor to operate at different speeds.

In the drawings the reference numeral 10 refers to a compressor driven by a gas turbine 12 in all embodiments illustrated except in that of Fig. 6. The air compressed in the compressor 10 is heated to the desired temperature in a combustion chamber 14 or the like. After leaving the gas turbine 12 the exhaust gases are piped through ducts 16 to the boiler 18 where a large part of the available heat energy is used first for generating steam and then for warming feed-water in an economizer before exhausting to the atmosphere. The steam thus generated is piped—possibly after superheating—through the steam lines 20 to the steam turbine system 22 where it expands and exhausts into the condenser 24. The condensate is returned to the boiler by the condensate and feed pump system 26. The boiler is provided with a fuel-oil burning system 28 to supply additional heat for steam generating during peak load conditions.

In the embodiments illustrated in Figs. 1 and 2, the combined plant output is realized by coupling the gas turbine 12 and steam turbine 22 to either end of an electric generator 30.

Figs. 2 and 4 illustrate the use of a regenerator 32 installed in the boiler 18 so as to heat the air delivered from the compressor 10. The source of heat in the boiler is the exhaust from the gas turbine 12. The compressed air ducts to and from the regenerator 32 may be arranged in such a way that by means of a two-way valve 34 the regenerator may be by-passed partially or completely for the purpose of increasing the heat available for steam generation and consequently for increasing the steam turbine output and thereby the steam turbine efficiency at higher load on the combined plant.

Fig. 3 illustrates the use of a special gas turbine 36 and combustion chamber 38, delivering output energy together with the output from the steam turbine system over a common reduction gear 40 to a single output shaft—in the case illustrated a propeller shaft 42. In this installation the steam turbine system is divided into two parts consisting of an ahead steam turbine 22 and an astern turbine 44. In order to shut down the special gas turbine 36 when the vessel is going astern a valve 46 shuts off the compressed air supply to the special combustion chamber 38. In this embodiment the gas turbine-driven compressor is equipped with a starting motor 48. Such a starting device was not necessary in the systems illustrated in Figs. 1 and 2 because they can be started by the aid of the steam turbines by lighting of the boiler by means of the fuel oil burners provided for peak loads. The steam turbine thereby starts the compressor and drives it during the starting period.

It is possible to make an electric starting motor serve a two-fold purpose. When run as a motor it can be used for starting. When the combined plant is functioning normally, the starting motor can be excited and used as a generator, e. g. for supplying power to the auxiliary machinery.

Fig. 4 demonstrates a plant similar to that shown in Fig. 3 except that a regenerator 32 is included with the by-passing two-way valve 34 corresponding to that shown in Fig. 2.

In Fig. 5 there is shown a combined plant with a gas turbine 12 coupled to the same reduction gear as is the steam turbine section 22, 44. For shutting down the gas turbine 12 during astern operation a two-way valve 60 is installed in such a way as to pipe the air directly from the compressor 10 to the boiler 18 when going astern and only to the combustion chamber 14 and gas turbine 12 when going ahead. The compressor remains coupled to the reduction gear 40 while going astern in order to provide combustion air to the boiler 18. In such an installation the compressor will suitably be of the centrifugal type.

All Figures 3 through 6 show plants with special ahead steam turbines 22 and astern turbines 44. These plants are all equipped with manoeuvring throttles 50 for ahead and 52 for astern operation.

If the compressor is installed as indicated in Fig. 5 the gas turbine and compressor shaft speeds will always be the same. If different shaft speeds are desired the plant can be laid out as shown in Fig. 6. Here the compressor shaft 54 is coupled to a separate reduction gear pinion 56.

Figure 7:
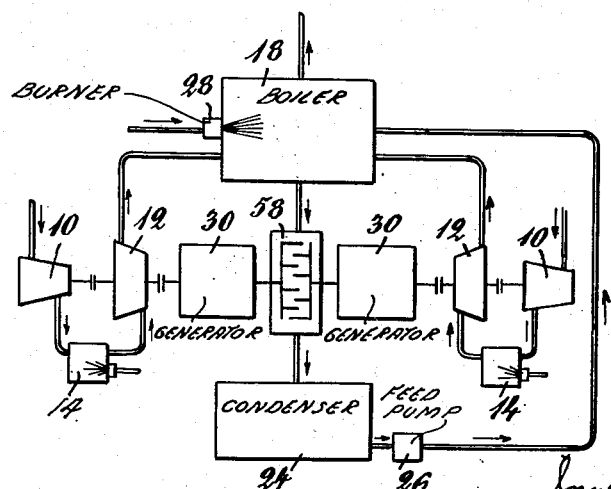
Fig. 7 shows a plant with a double rotating steam turbine coupled between two electric generators and one gas turbine system outside each of the generators.

Fig. 7 illustrates a modification of the plants illustrated in Figs. 1 and 2, the steam turbine being designed as a double-rotation turbine 58. This double-rotation turbine is thereby suitably coupled between duplicate electric generators 30. In order to maintain torque balance in the system two gas turbine systems 12 of the same output are simultaneously coupled to the generators, one on each end of the tandem plant.

In Figs. 8 and 9 regenerator tubes 32 are installed in the economizer for the purpose of pre-heating the air compressed in the compressor 10, said compressed air after being heated in the combustion chamber 14 being utilized as motive fluid in the gas turbine 12. In Fig. 8 the compressor 10 is of the two-stage type with an inter-cooler 72 between the stages, but the compressor may, of course, also be designed for compression in one or more than two stages. The inter-cooling provides a certain gain due to decreased power consumption for the compression. In a combined plant according to the invention heat losses due to inter-cooling will be compensated for by the heat surplus of the exhaust which has not been spent for feed-water preheating in the economizer with the result that the desired admission temperature of the motive fluid can be maintained without additional fuel supply to the combustion chamber.

Fig. 8 demonstrates the layout used for installing the regenerator in series with respect to gas flow between two sections of the feed-water heating tubes 62. In this installation the feed-water by-passes around the part of the economizer which contains the regenerator.

Fig. 9 demonstrates the alternative method of regeneration in which the regenerator tubes 32 and the feed-water tubes 62 are installed in parallel with respect to gas flow within the generating part of the boiler's economizer section.

In the first type of installation, pre-heating of the feed-water is effected by gases which have passed the regenerator, and the economizer section ahead of the regenerator with respect to gas flow brings the feed-water up to the steam generating temperature before entering the steam generator. In the second type of installation, the economizer tubes must continue in the gas path following the regenerator tubes to such an extent as to further warm the pre-heated feed-water to the steam generating temperature.

In both installations according to Figs. 8 and 9 there is also inserted a heat exchanger 68, 70 in the end of the boiler near the stack to remove the surplus available heat energy from the stack gases for use, for example in generating low-temperature steam or producing warm water. By means of such an arrangement the stack losses can be further reduced thus raising the overall thermal efficiency to a still higher level.

Fig. 8 also illustrates a plant in which the gas power section contains two gas turbines 12 and 36 with inter-combustion in a combustion chamber 38, and coupled in series with regard to the flow of motive fluid. The advantages of such an arrangement are obvious from the following.

In the usual cycle using only gas turbines with two or more turbines working in series, each equipped with a combustion chamber, it is more economical from the fuel consumption point of view to take the useful power output from the high pressure turbine, thus leaving the low pressure turbine (or turbines) to drive the compressor. The reason for this constuction is that the compressor requires approximately twice as much power as the whole plant develops in shaft horsepower. Assuming the same admission temperature to every turbine (which one strives to keep as high as the resistance of the material will permit) the exhaust gas temperature will be the lowest in the turbine that has the largest pressure drop and, consequently, temperature drop. The exhaust gases from the low pressure turbine eventually go to the stack after passing through a regenerator, if the plant is so equipped. The heat lost through the escaping stack gases thus becomes dependent on the temperature after the low pressure turbine. Now, the largest power output is taken from the low pressure turbine; the pressure drop, and therefore the temperature drop, becomes greatest in this turbine resulting in lower stack gas temperatures with accompanyingly lower heat losses to the atmosphere.

The thermal efficiency of this plant with the same conditions of the important variables, temperature, pressure, etc., becomes highest in such a plant when the low pressure turbine produces the largest power output.

The situation is different in a combined plant according to the invention, in which the exhaust gas from the gas turbine section is used for steam generating for the steam section. It is a well known fact that there is a relation between steam pressure and the temperature of saturated steam, namely that increasing the temperature results in a corresponding pressure rise. It is also well known that the water rate of a steam plant goes down with an increase of steam pressure and temperature. For this reason in the combined plant it should be attempted to maintain the gas temperature entering the steam system high to produce steam pressures and temperatures that are high enough to assure a satisfactory heat rate in the steam system. Of course the required gas temperature entering the steam system could be obtained by additional fuel burning in the boiler. Such additional heating, however, makes it less possible rationally to utilize the heat produced by the fuel than if the fuel were burned ahead of the gas turbine, since heat produced immediately before the steam system will be converted to useful output only in the steam system which has a lower thermal efficiency than the combined plant.

Calculations show that if the compressor is driven with the low pressure turbine as in a true gas turbine system, a thermal efficiency of 32.5% is achieved in the combined system, assuming the following conditions:

Gas temperature before each turbine___° C__ 700
Pressure ratio across high pressure turbine___ 1.73
Pressure ratio across low pressure turbine___ 2.34
Efficiency of compressor_____per cent__ 80
Efficiency of gas turbine_____do____ 85
Efficiency of steam turbine_____do____ 78
Efficiency of reduction gear_____do____ 98
Temperature of air entering system___° C__ 20
Cooling water temperature to condenser ° C__ 20
Condenser vacuum_____per cent__ 96
Stack gas temperature_____° C__ 120

Assuming the same conditions in a case where the compressor is driven by the high pressure turbine (by exchanging the pressure drop values for the low and high pressure turbines) a thermal efficiency of about 34.4% is achieved in the combined plant for the following reasons:

The exhaust gas temperature after the low pressure turbine or before the boiler was 538° C. in the first case, and 594° C. in the second. This means that in the first case a steam pressure of 18 kg./cm.$^2$ can be obtained with a corresponding temperature of about 197° C., while in the second case the steam pressure increases to about 40 kg./cm.$^2$ with a corresponding saturated steam temperature of about 251° C.

These two examples are chosen to illustrate the case with a comparatively low gas temperature. The dividing of the power output between the steam and gas systems is different with higher gas temperature. Considering a gas temperature entering the turbine of 1200° C. the compressor will require only 45% of the power, in other words less than half of the combined plant output. Under such conditions it is therefore more advantageous in the combined plant to drive the compressor with the low pressure turbine. The two systems of compressor driving have the same efficiency when the gas temperature before each turbine reaches about 1000° C.

We claim:

1. A power plant comprising; a primary gas power section of the continuous combustion type having compressor means for compressong a gaseous combustion supporting medium, combustion chamber means for converting said medium into gaseous motive fluid consisting of products of combustion, and gas engine means operated by said motive fluid; a secondary steam power section operated primarily by heat derived from gases exhausted from said gas power section and having steam turbine means and generating means including an economizer section for supplying steam to said turbine means; a regenerator for transferring heat from heating gases flowing through said generating means to the compressed gaseous medium delivered by said compressor means; said regenerator being connected to receive said gaseous medium delivered from said compressor means and to deliver said gaseous medium to said combustion chamber means and being located to be traversed by said heating gases after said gases have left the boiler section of said generating means and before said gases have traversed at least a portion of said economizer section, and conduit means for conducting said motive fluid to said generating means after final expansion in and at substantially the temperature as exhausted from said gas power section.

2. A power plant as set forth in claim 1 in which a sufficient portion of the economizer section is located in the path of the gases between the vaporizing portion of the generator and the regenerator to bring the feed water to vaporizing temperature before entering said vaporizing portion.

3. A power plant as set forth in claim 1 in which the regenerator is located for series flow of gases thereover between two portions of the economizer section.

4. A power plant as set forth in claim 1 in which said regenerator and said economizer comprise tubular structures and in which tubes of the regenerator and the economizer section are arranged in parallel with respect to flow of gases thereover.

5. A power plant as set forth in claim 1 in which said regenerator is connected in parallel with conduit means connecting said compressor means with said combustion chamber means and in which a controlled by-pass is provided in said conduit means for regulating flow of the compressed gaseous medium through said regenerator.

6. A plant as set forth in claim 1 in which said gas engine means comprises separate gas engines and said combustion chamber means is arranged to supply motive fluid to the different gas engines at substantially the same inlet temperature, one of said engines effecting a lesser heat drop of the motive fluid than the other and said conduit means being arranged to conduct motive fluid exhausted from said one of said gas engines to said generator.

7. A plant as set forth in claim 6 in which said one of said engines is separate from the compressor means and develops the net useful power output of the gas power section of the plant.

8. A plant as set forth in claim 6 in which said different engines are connected in parallel with respect to flow of motive fluid and said conduit means conducts motive fluid therefrom to said generator.

9. A plant as set forth in claim 28 in which said combustion chamber means comprises a separate combustion chamber for each gas engine.

10. A plant as set forth in claim 1 in which said gas engine means and said steam turbine means are designed for substantially equal useful power output and are coupled to directly drive an electric generator.

11. A plant as set forth in claim 1 in which said gas engine means and said steam turbine means are designed for substantially equal useful power output and comprise at least one steam turbine and one gas engine geared to a common output shaft.

12. A plant as set forth in claim 11 in which said steam turbine means includes both a forward and a reverse turbine geared to said shaft and in which means are provided for shutting off the supply of motive fluid to the geared gas engine when the reverse steam turbine is operated.

13. A plant as set forth in claim 12 in which said compressor means comprises a compressor geared to said output shaft.

14. A plant as set forth in claim 13 in which said compressor is geared to said shaft to rotate at a speed different from that of the gas engine geared to the shaft.

15. A plant as set forth in claim 13 in which the geared compressor is of the centrifugal type capable of operating in either direction of rotation.

16. A power plant as set forth in claim 1 in which said steam turbine means comprises a turbine having oppositely rotating rotors and said gas engine means comprises a separate engine connected to each of the shafts of the double rotation turbine.

17. A power plant comprising; a gas power section of the continuous combustion type having compressor means for compressing a gaseous combustion supporting medium, gas engine means comprising high and low pressure engines connected in series for flow of motive fluid therethrough and combustion chamber means comprising separate combustion chambers for heating the motive fluid delivered to each of said engines to substantially the same admission temperature, said low pressure engine developing the net useful power delivered by said gas power section and being designed for a lesser heat drop than said high pressure engine; a steam power section having turbine means and generating means for supplying steam to said turbine means; conduit means for conducting motive fluid substantially at the pressure and temperature as exhausted from said gas engine means to said generator, a common power output shaft, said low pressure engine and said steam turbine means being geared to said shaft, said steam turbine means including a forward and a reverse turbine, and said conduit means including a by-pass conduit for conducting motive fluid exhausted from the high pressure engine directly to said generator when said reverse turbine is in operation.

18. A plant as set forth in claim 17 in which said gas power section includes a regenerator located in the generating means of the steam power section.

19. A plant as set forth in claim 17 in which the gas power section includes a regenerator and the generating means includes a vaporizing portion and an economizer portion, said regenerator being located so that the gases flow through the vaporizing portion, at least a part of the economizer portion and the regenerator in the order named.

20. A plant as set forth in claim 17 in which the generating means further includes a superheater located in the path of gas flow in advance of said vaporizing portion.

21. A power plant comprising; a gas power section of the continuous combustion type having compressor means for compressing a gaseous combustion supporting medium, combustion chamber means for converting said medium into gaseous motive fluid consisting of products of combustion, and gas engine means operated by said motive fluid; a steam power section having steam turbine means and generating means including an economizer section for supplying steam to said turbine means; a regenerator for transferring heat from heating gases flowing through said generating means to the compressed gaseous medium delivered by said compressor means; said regenerator being connected to receive said gaseous medium delivered from said compressor means and to deliver said gaseous medium to said combustion chamber means and being located in that portion of the economizer section where in the absence of the regenerator the feed water temperature would rise at substantially the same rate as the temperature drop of the gases, and conduit means for conducting said motive fluid to said generating means after final expansion in and at substantially the temperature as exhausted from said gas power section.

VILHELM F. A. NORDSTRÖM.
DIMITRIJ A. MOROSOFF.

(References on following page)

References Cited in the file of this patent

UNITED STATES PATENTS

| Number | Name | Date |
|---|---|---|
| 1,694,144 | Rosencrants | Dec. 4, 1928 |
| 1,757,045 | Holzwarth | May 6, 1930 |
| 1,795,317 | Sengstaken | Mar. 10, 1931 |
| 1,944,892 | Holzwarth | Jan. 30, 1934 |
| 1,951,360 | Holzwarth | Mar. 20, 1934 |
| 1,978,837 | Forsling | Oct. 30, 1934 |
| 2,115,338 | Lysholm | Apr. 26, 1938 |
| 2,294,700 | Stroehlen | Sept. 1, 1942 |
| 2,371,889 | Hermitte | Mar. 20, 1945 |
| 2,392,325 | Kuhner | Jan. 8, 1946 |
| 2,403,388 | Morey | July 2, 1946 |
| 2,421,387 | Lysholm | June 3, 1947 |
| 2,428,136 | Barr | Sept. 30, 1947 |
| 2,466,723 | Mercier et al. | Apr. 12, 1949 |
| 2,477,184 | Imbert | July 26, 1949 |
| 2,478,851 | Traupel | Aug. 9, 1949 |
| 2,486,291 | Karrer | Oct. 25, 1949 |
| 2,540,598 | Ruiz | Feb. 6, 1951 |
| 2,605,610 | Hermitte et al. | Aug. 5, 1952 |

FOREIGN PATENTS

| Number | Country | Date |
|---|---|---|
| 597,656 | France | Sept. 7, 1925 |
| 254,066 | Switzerland | Dec. 1, 1948 |